United States Patent

Takano et al.

[11] Patent Number: 5,867,996
[45] Date of Patent: Feb. 9, 1999

[54] COMPRESSOR CONTROL DEVICE FOR VEHICLE AIR CONDITIONER

[75] Inventors: Yoshiaki Takano, Oobu; Hiroshi Kishita, Anjo; Kurato Yamasaki, Kariya; Yasuhiko Niimi, Handa, all of Japan

[73] Assignee: Denso Corporation, Kariya, Japan

[21] Appl. No.: 7,661

[22] Filed: Jan. 15, 1998

[30] Foreign Application Priority Data

| Feb. 24, 1997 | [JP] | Japan | ................................. 9-039494 |
| Feb. 24, 1997 | [JP] | Japan | ................................. 9-039495 |
| Sep. 16, 1997 | [JP] | Japan | ................................. 9-251150 |

[51] Int. Cl.$^6$ ............................................... F25B 7/00
[52] U.S. Cl. ............................... 62/175; 62/236; 62/323.3; 62/228.4
[58] Field of Search ..................... 62/236, 323.3, 62/226, 228.1, 228.4, 133, 175

[56] References Cited

U.S. PATENT DOCUMENTS

| 2,986,896 | 6/1961 | Hann ................................... 62/236 X |
| 3,941,012 | 3/1976 | Mayer .................................. 62/236 X |
| 5,056,330 | 10/1991 | Isobe et al. .............................. 62/236 |
| 5,487,278 | 1/1996 | Hilleveld et al. .................. 62/323.3 X |

FOREIGN PATENT DOCUMENTS

| 3-61176 | 6/1991 | Japan . |
| 6-87678 | 12/1994 | Japan . |

*Primary Examiner*—Henry Bennett
*Assistant Examiner*—Susanne C. Tinker
*Attorney, Agent, or Firm*—Harness, Dickey & Pierce, PLC

[57] ABSTRACT

A compressor control device is presented to control driving power of a compressor of a vehicle air conditioner. The control device is composed of a first means which detects ambient temperature conditions of the vehicle, a second means which decides a necessary air-conditioning capacity according to the ambient temperature conditions and a third means which transmits driving power to the compressor from the engine when the necessary cooling capacity is larger than a reference capacity and from the electric motor when said necessary cooling capacity is not larger than said reference capacity.

14 Claims, 4 Drawing Sheets

COMPRESSOR CONTROL DEVICE FOR VEHICLE AIR CONDITIONER

CROSS REFERENCE TO RELATED APPLICATION

The present application is based on and claims priority from Japanese Patent Applications Hei 9-39494 filed on Feb. 24, 1997, Hei 9-39495 filed on Feb. 24, 1997 and Hei 9-251150 filed on Sep. 16, 1997, the contents of which are incorporated herein by reference.

BACKGROUND OF THE INVENTION

1. Field of the Invention

The present invention relates to a vehicle hybrid compressor which is driven selectively by one of two power sources.

2. Description of the Related Art

Usually, a hybrid type compressor for a vehicle is driven by an engine when the engine operates and driven by an electric motor when the engine stops. However, when the compressor of an air conditioner is driven by the electric motor under very hot temperature in full summer, the electric motor is required to have high power. This necessitates a large size electric motor.

SUMMARY OF THE INVENTION

Therefore, a main object of the present invention is to provide an improved compressor control device which does not require a large-sized electric motor for driving the compressor.

According to a main feature of the present invention, a compressor control device is composed of means for deciding necessary air-conditioning capacity according to the ambient conditions of a vehicle and means for transmitting driving power to the compressor from the engine when the necessary cooling capacity is larger than a reference capacity, and from the electric motor when the necessary cooling capacity is not larger than said reference capacity. Therefore, the electric motor for driving the compressor can be made compact.

The compressor is preferably provided with variable output capacity, and a control unit is provided to change the capacity according to the necessary air-conditioning capacity. The control unit, preferably, sets the capacity of the compressor to a capacity lower than the reference capacity before the driving power is transmitted from the electric motor and a suitable capacity according to necessary air-conditioning capacity thereafter. Therefore, the compressor can be driven by a sized electric motor.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A control device used in the air conditioner for a truck according to a preferred embodiment is described with reference to FIGS. 1–4. Usually, the engine mounted on the truck is stopped while the truck parks.

Figure 1:
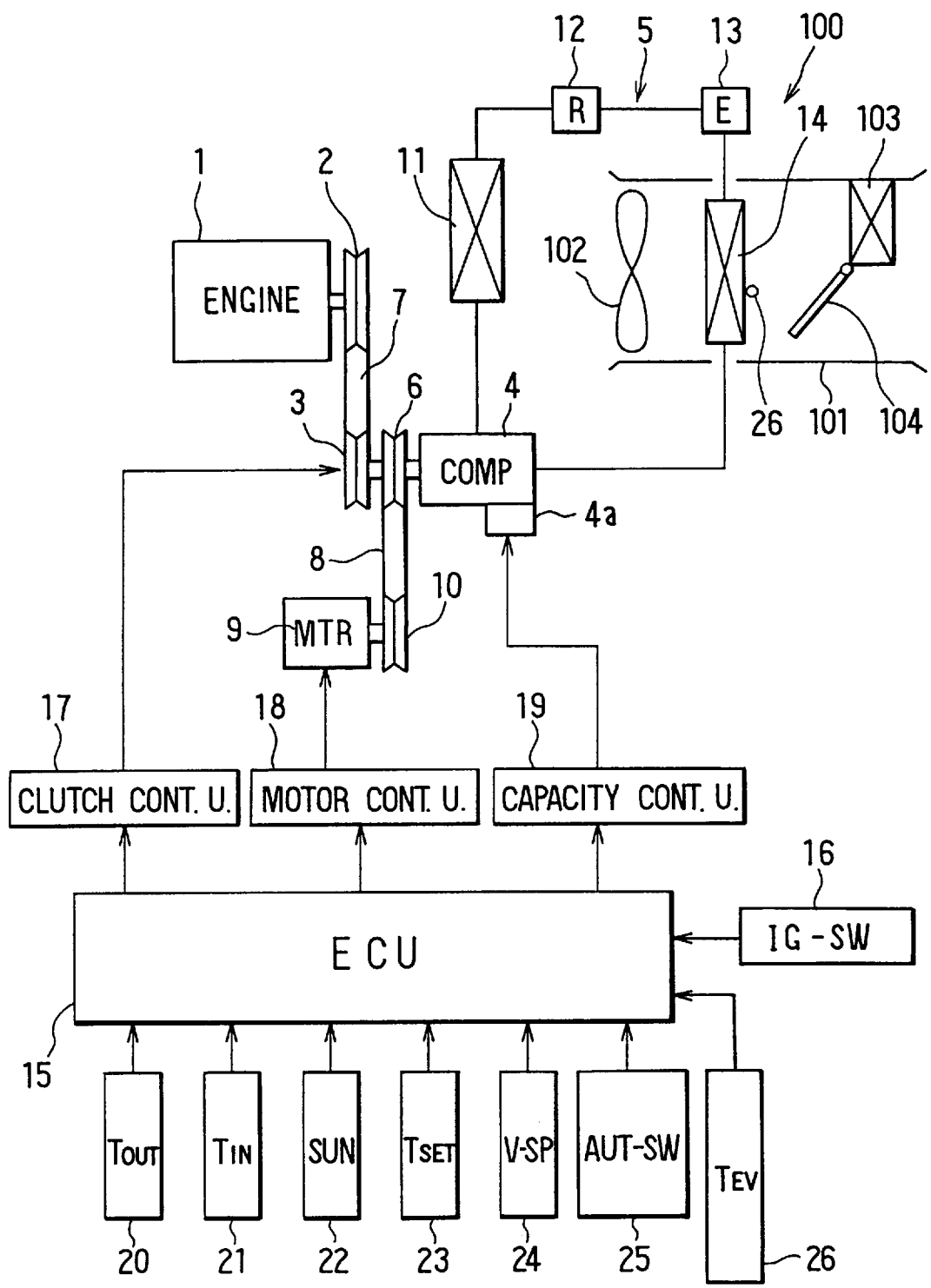
FIG. 1 is a schematic view illustrating a vehicle air conditioning system having a compressor control device according to a preferred embodiment of the present invention.

In FIG. 1, an engine 1 has an output shaft to which a driving pulley 2 is fixed. A electromagnetic clutch 3 is connected to the driving pulley 2 by a belt 7. A variable capacity compressor 4 is a part of the refrigerating cycle 5 and has a driven shaft connected to the clutch 3 and a pulley 6. The pulley 6 is connected to a pulley 10 by a belt 8 so that the compressor is selectively driven by the engine 1 or a electric motor 9. The electric motor 9 is powered by the vehicle battery (not shown). The pulley 6 is disposed coaxially with the shaft of the electromagnetic clutch 3. When the clutch 3 is energized, the compressor 4 is driven by the engine 1 through the pulley 6. The motor 9 has an output shaft to which the pulley 10 is fixed. When the compressor is driven by the motor 9, the electromagnetic clutch 3 is deenergized to cut off the connection between the engine 1 and the compressor 4.

The compressor 4 changes the capacity thereof according to an outside signal. The compressor 4 is a swash-plate type compressor which has a crank chamber. The capacity of the compressor 4 is changed by changing the inclination angle of the swash plate which is controlled by the pressure Ps in the crank chamber. The pressure Ps is controlled by an electro-magnetic control unit 4a. The refrigeration cycle 5 is composed of the compressor 4, a condenser 11, a receiver 12, an expansion valve 13 and a evaporator 14, which are well known.

The evaporator 14 is disposed in an air conditioner 100 as shown in FIG. 1. The air conditioner 100 has a case 101, in which a air blower 102, the evaporator 14, a heater core 103 and an air-mix door 104 are housed. The electromagnetic clutch 3, the compressor 4 and the motor 9 are controlled by a electronic control unit (ECU) 15 in a well-known manner.

The ECU 15 has output terminals connected respectively to a clutch control unit 17, a motor driving circuit 18 and a capacity control unit 19. The ECU 15 is energized when the ignition switch 16 is turned on to operate the engine. The electromagnetic clutch 3 is controlled by the ECU 15 via the clutch control circuit 17. The electric motor 9 is controlled by the ECU 15 via the motor driving unit 18, and the electro-magnetic control unit 4a is controlled by the ECU 15 through the capacity control unit 19. The ECU 15 has input terminals connected to an outside temperature sensor 20, a room temperature sensor 21, a sun light sensor 22, a temperature setting unit 23, a vehicle speed sensor 24, an automatic control switch 25 which controls the air conditioner 100 according to the signals from the above sensors and the setting unit 20–24 and a temperature sensor 26 which detects the air having passed through the evaporator 14. The compressor 4 and the blower 102 are automatically operated when the automatic control switch 25 is turned on.

Figure 2:
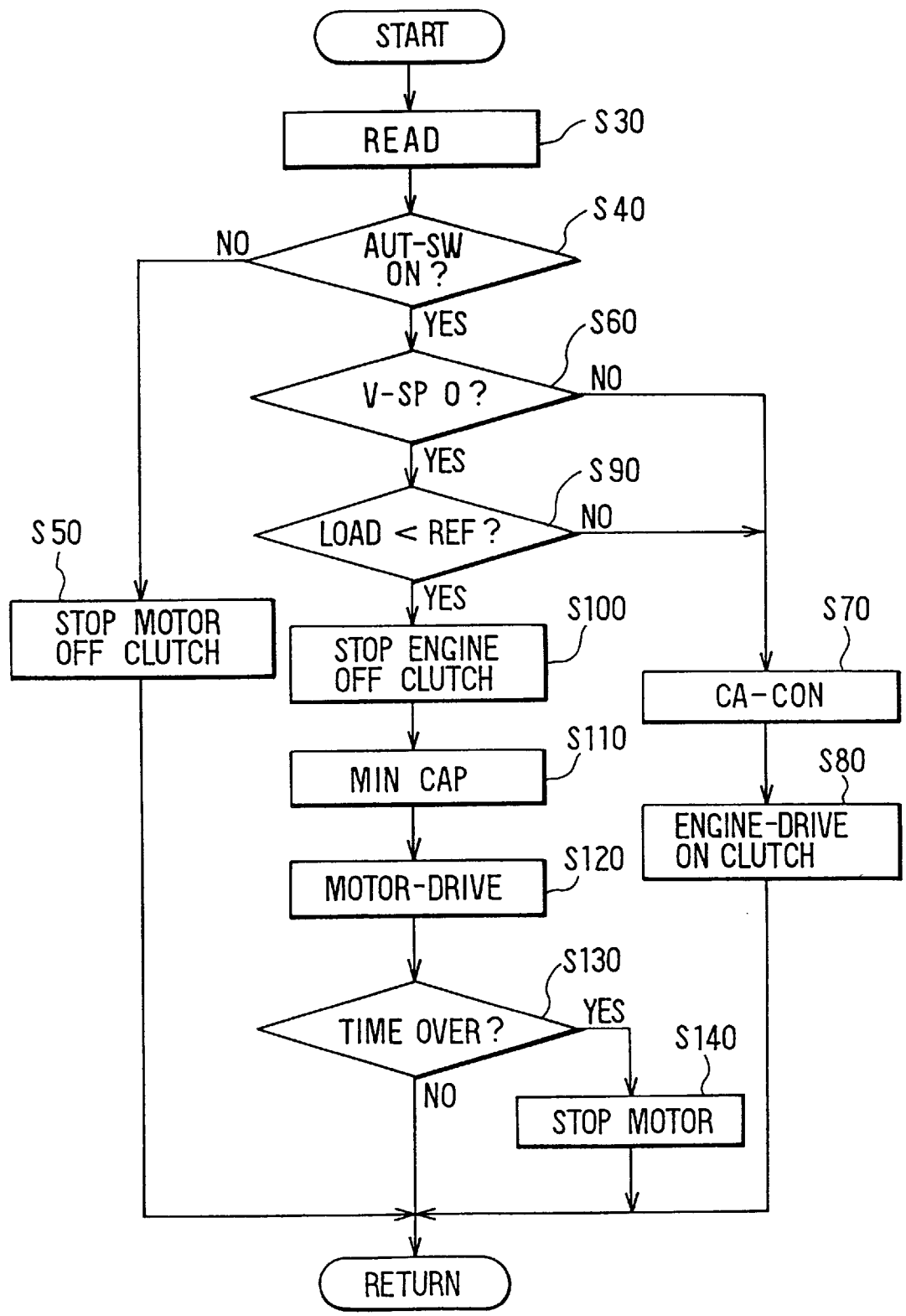
FIG. 2 is a flow chart of operation of an ECU according to the preferred embodiment.
Figure 3:
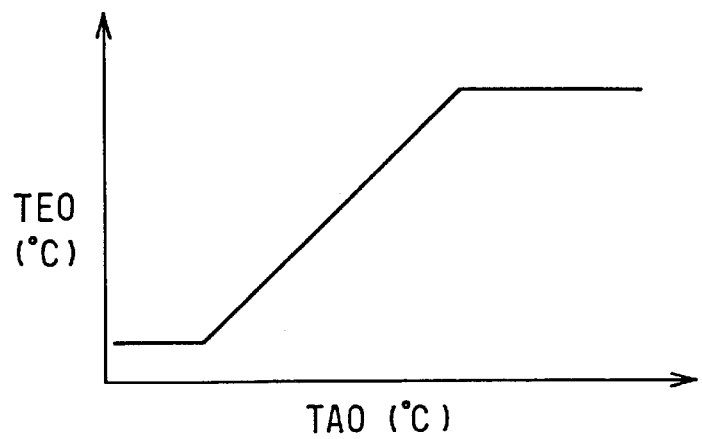
FIG. 3 is a graph showing relationship between the target temperature of the air which has just passed through the evaporator and the target temperature of the air blow.

The operation of the ECU 15 is described with reference to a flow chart shown in FIG. 2.

When the ignition switch 16 is turned on, the signals from the sensors 20–22, 24, 25 and the signal from the setting unit 23 are read and memorized in step S30. Then, whether the automatic switch 25 is turned on or not is examined in step S 40. When the automatic switch 25 is turned off, the process goes to step S50 to stop the motor 9 and to turn off the electromagnetic clutch 3. Thus, the compressor 4 becomes inoperative. On the other hand, when the automatic switch 25 is turned on, the process proceeds to S60, where whether the vehicle speed is 0 or not is examined.

If the vehicle speed is not 0, that is, if the vehicle is running, the process goes to S70, where the capacity of the compressor 4 is controlled by the capacity control unit 19 via electro-magnetic control unit 4a. Thereafter, the process goes to S80 to operate the electromagnetic clutch 3 to drive the compressor 4 by the engine 1.

The capacity of the compressor 4 is controlled as follows.

At first, a target temperature (hereinafter referred to as the target blow-air-temperature) TAO of the cooling air to be blown is calculated according to the signals from the outside temperature sensor 20, the room temperature sensor 21, the sun light sensor 22 and the temperature setting unit 23. Then, a target temperature (hereinafter referred to as the target evaporator-air-temperature) TEO of the air which just passes through the evaporator 14 is decided on the basis of the target blow-air-temperature TAO. The relationship between the target evaporator-air-temperature TEO and the target blow-air-temperature TAO is set as shown in a graph in FIG. 3. That is, the target evaporator-air-temperature TEO becomes higher as the target air-blow-temperature TAO becomes higher. The electro-magnetic control unit 4a controls the capacity of the compressor 4 so that the temperature detected by the temperature sensor 26 becomes equal to the target evaporator-air-temperature TEO. Thus, as the target evaporator-air-temperature TEO increases, the capacity of the compressor 4 is required to decrease.

If the vehicle speed is detected 0, the process goes to step S90 to examine whether the air-conditioning load (required cooling capacity) is larger than a reference value. For example, if the outside temperature is very high (e.g. higher than 30° C.), and the temperature of the passenger compartment (room temperature) is also very high (e.g. higher than 30° C.), the air-conditioning load of the compressor 4 is large. If the air-conditioning load is determined not smaller than the reference value (NO), steps S70 and S80 follows. Thus, the capacity of the compressor 4 is changed according to an amount of the air-conditioning load (S70), and the engine 1 starts and the electromagnetic clutch 3 is turned on to drive the compressor 4 by the engine 1 automatically (S80).

On the other hand, if the air-conditioning load is smaller than the reference value (YES), the process goes to step S100 to stop the engine 1 and turn off the electro-magnetic clutch 3, the capacity of the compressor 4 is lowered to a minimum value by the electromagnetic control unit 4a in step S110, and the electric motor 9 is started. For example, when a truck equipped with this system stops to be unloaded, the engine 1 stops and the electric motor 9 starts to drive the compressor automatically after the capacity of the compressor 4 is lowered to a minimum value, although the ignition switch 16 is on if the air-conditioning load is smaller than the reference value. Once the compressor 4 is driven by the motor 9, the low capacity operation of the compressor is maintained until the engine is restarted. Therefore, comfortable air conditioning can be provided with small driving power of the motor 9.

In step S130, the motor driving time is measured and the process goes to step S140 if the driving time becomes T (e.g. 2 minutes) to stop the motor 9. Thus, the battery is prevented from over-discharging.

If a driver intends to start the engine 1, he should turn off the ignition switch 16 if it has been on, and, thereafter, turn it on again. In this case, a timer is provided with so that the engine 1 does not stop even if the vehicle speed is zero.

Figure 4:
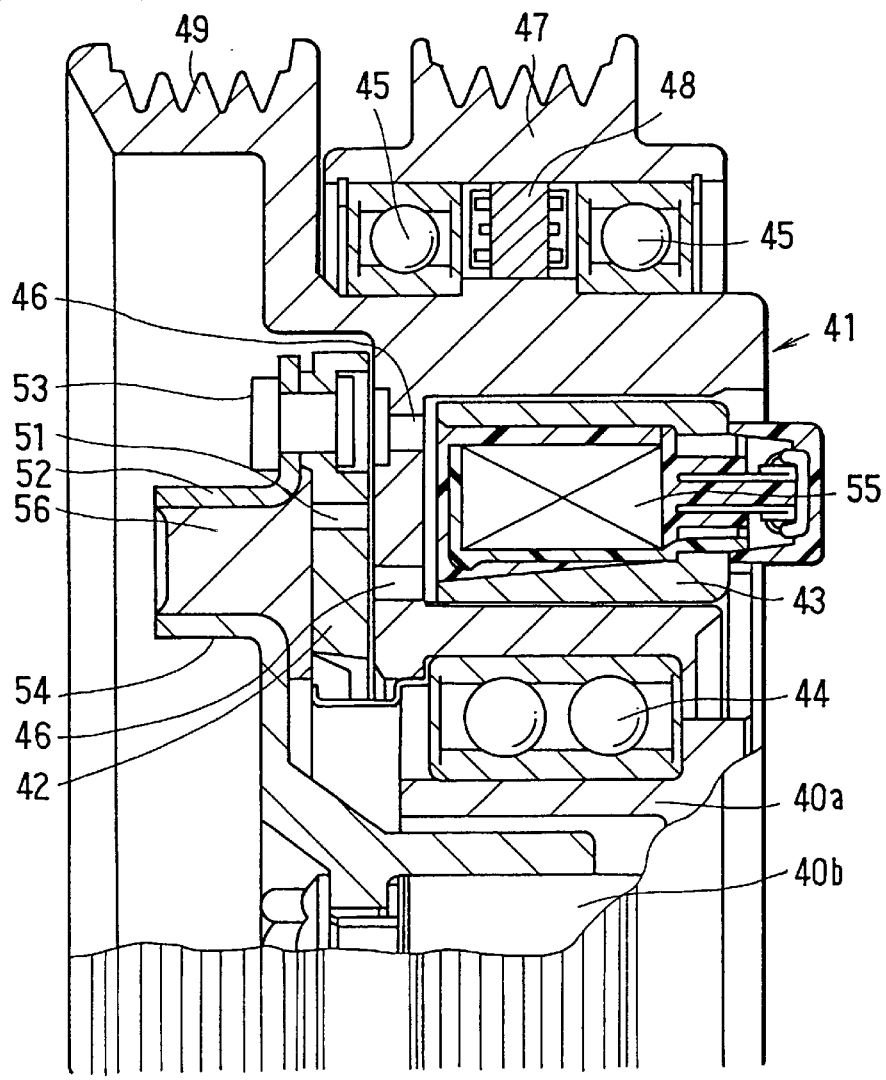
FIG. 4 is a cross-sectional view illustrating an electromagnetic clutch used in the control device according to the preferred embodiment of the present invention.

Another structure of the electromagnetic clutch 3 to used in the preferred embodiment is described with reference to FIG. 4. The electromagnetic clutch 3 and the pulley 6 are combined in a unit in this embodiment. When the compressor 4 is operated by the engine or the motor, the electromagnetic clutch 3 is turned on. The electromagnetic clutch 3 is mainly composed of a rotor 41, an armature 42 and a stator 43 as illustrated in FIG. 4.

The rotor 41 is made of magnetic steel (e.g. SPCC of JIS). The rotor has a ring member having U-shaped annular groove whose bottom has two annular gaps 46.

The stator 43 has a molded coil unit 55 and is disposed in the U-shaped annular groove of the rotor 41. The outer ring of a ball bearing 44 is press-fitted to the inner periphery of the rotor 41 and the inner ring of the bearing 44 is fitted to a portion of the compressor housing 40a. Thus, the rotor 41 is rotatable with respect to the housing 40a. A pair of ball bearings 45 are fixed side by side to the outer periphery of the rotor 41, and a pulley 47 is fixed to the outer periphery of the bearings 45. The belt 7 engages the pulley 47 and connects it to the pulley 2 as shown in FIG. 1. A sprag type one-way clutch 48 is disposed between the rotor 41 and the pulley 47 so that the pulley 47 can rotate in one direction (e.g. from the front of FIG. 4 to the back). A pulley 49 is formed integrally with the rotor 41. The pulley 49 has the belt 8 thereon to connect to the pulley 10 of the motor 9 as shown in FIG. 1.

The armature 42 is made of magnetic material (e.g. SPCC of JIS) and is formed into a ring. The armature 42 is disposed to face the bottom surface of the rotor 41 which has the annular gaps 46 at a distance thereto. The armature 42 has an annular magnetic insulation gap 51 and is connected to an annular outer hub 52 by rivets 53. An inner hub 54 is disposed radially inside the outer hub 52 and connected thereto by a rubber member 56 which is put in the space between the outer and inner hubs 52 and 54 and vulcanized. The inner hub 54 has an inner member extending to the housing 40a, into which the shaft 40b of the compressor 4 is fitted.

When the coil unit 55 of the electromagnetic clutch 3 is energized, the armature 42 is pulled to the right in FIG. 4. Thus, the compressor 4 is driven by the engine 1 or the electric motor 9.

For example, when the engine 1 operates and rotates the pulley 2, the pulley 47 is driven by the pulley 2 via the belt 7. Accordingly, the rotor 41 is rotated by the pulley 47 via the one-way clutch 48, so that the armature 42 is rotated to drive the compressor 4 via the rubber member 56, the inner hub 54 and the shaft 40b. The pulley 49 is also rotated together with the rotor 41. On the other hand, when the engine stops and the electric motor 9 is operated, the pulley 49 is driven by the motor 9 via the belt 8. Accordingly, the rotor 41 is rotated by the pulley 49 directly. Thus, the compressor 4 is driven by the electric motor 9 in the same manner stated above. The pulley 47 is not driven by the pulley 49 or the rotor 41 because one way clutch 48 is disposed between the pulley 47 and the rotor 41 to cut the rotation torque.

Figure 5:
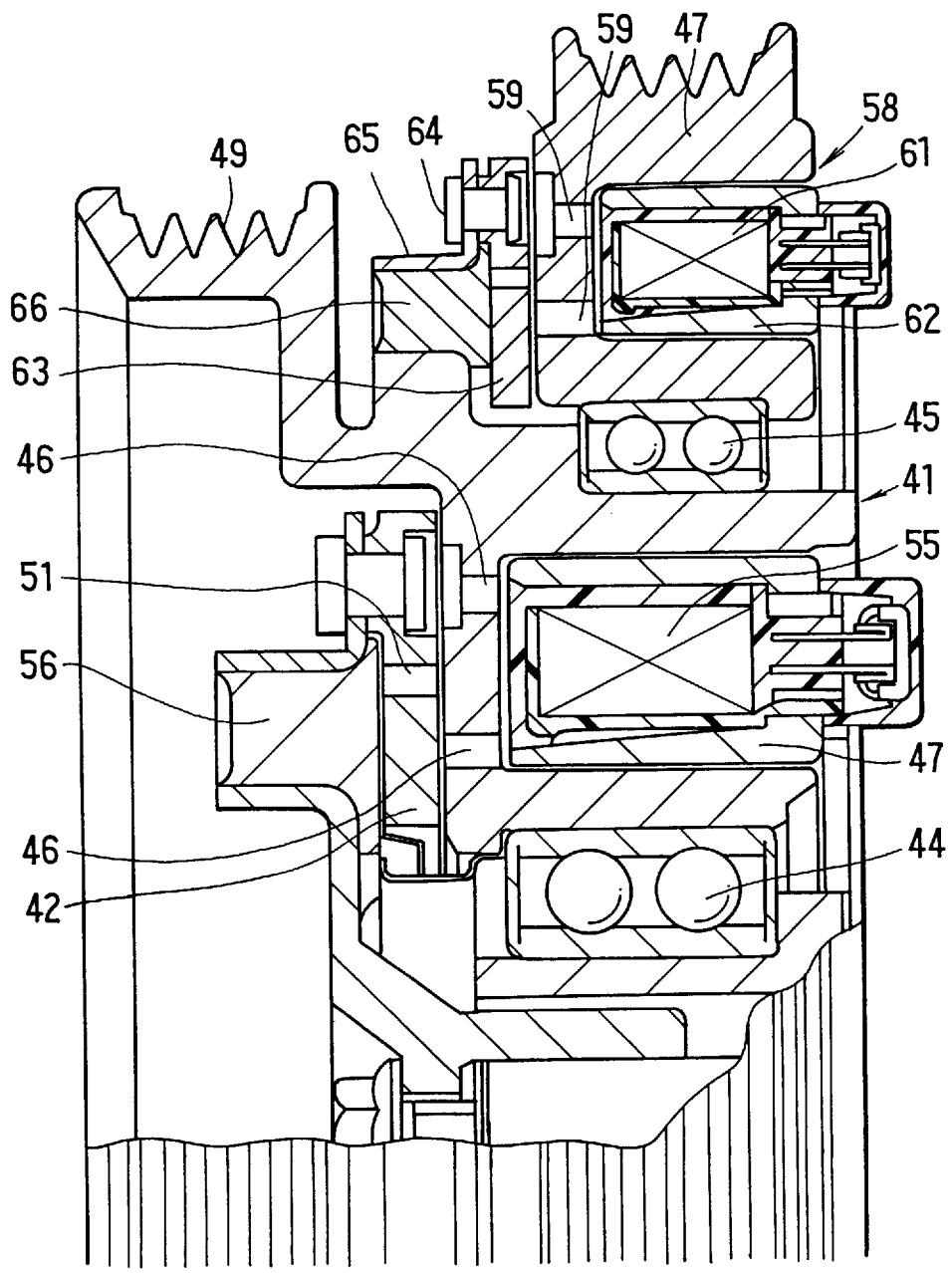
FIG. 5 is a cross-sectional view illustrating another electromagnetic clutch used in the control device according to the preferred embodiment of the present invention.

Another structure of the electromagnetic clutch 3 is described with reference to FIG. 5.

A rotor 58 having a U-shaped annular groove is disposed around the ball bearing 48. An annular magnetic insulation gap 59 is formed in the bottom of the annular groove. The rotor 58 has the pulley 47 integrally formed therewith. A stator 62 having a coil unit 61 is disposed in the annular groove of the rotor 58. An armature 63 is disposed to face the bottom surface of the rotor 58 at a distance therefrom. The armature 63 is fixed to an outer hub 65 by rivets and connected to the outer periphery of the rotor 41 via a rubber member 66 which is vulcanized.

When the coil 55 is energized and the coil 61 is not energized, the rotor 41 and the armature 42 engage with each other to drive the pulley 49 while the pulley 47 lies idle. Thus, the compressor 4 is driven by the electric motor 9. When both coil 55 and coil 61 are energized, the rotor 41 and the armature 42 engage with each other and, also the rotor 58 and the armature 63 engages each other, so that the driving torque is transmitted from the pulley 47 through the armature 63 to the rotor 41. Thus, the compressor 4 is driven by the rotor 41 via the armature 42.

Although a preferred embodiment is described above, the rotation speed of the electric motor 9 can be changed according to the air-conditioning load. Also the air-conditioning load can be decided according to the target air-blow temperature TAO and/or the target evaporator-air-temperature TEO. The capacity of the compressor 4 can be estimated according to the intake pressure and discharging pressure of the compressor 4. A fixed capacity type, a scroll type or a vane type compressor can be used to the control device according to the above embodiments of the present invention.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A compressor control device for a vehicle air conditioner which includes a compressor selectively driven by one of an engine and an electric motor, said control device comprising:

first means for detecting ambient conditions;

second means for deciding necessary air-conditioning capacity according to said ambient conditions of said vehicle; and third means, connected between said second means and said compressor, for transmitting driving power to said compressor from said engine when said necessary cooling capacity is larger than a reference capacity, and from said electric motor when said necessary cooling capacity is not larger than said reference capacity.

2. A compressor control device as claimed in claim 1, wherein said compressor is provided with variable output capacity, and said third means comprises a control unit, controlling said variable capacity according to said necessary air-conditioning capacity.

3. A compressor control device as claimed in claim 2, wherein said third means changes said driving power from one of said engine and said electric motor to the other according to control of said variable capacity.

4. A compressor control device as claimed in claim 2, wherein said control unit sets said output capacity to a capacity lower than said reference capacity when said third means transmits said driving power from said electric motor.

5. A compressor control device as claimed in claim 3, wherein said control unit sets said variable capacity to a suitable capacity according to necessary air-conditioning capacity when said third means transmits said driving power from said engine.

6. A compressor control device as claimed in claim 1, wherein said third means comprises fourth means for stopping said engine when said vehicle stops and said cooling capacity is not larger than said reference capacity.

7. A compressor control device as claimed in claim 4, said capacity lower than said reference value is a minimum capacity of said compressor.

8. A compressor control device as claimed in claim 6, wherein said third means comprises fifth means for operating one of said engine and said electric motor while said engine is stopped by the key switch if said second means decides a necessary air-conditioning capacity.

9. A compressor control device for a vehicle air conditioner which include a variable compressor driven by an electric motor, said device comprising:

first means for detecting ambient conditions;

second means for deciding a necessary air-conditioning capacity according to said ambient condition of said vehicle; and third means for controlling said variable capacity according to said necessary air-conditioning capacity, said third means setting said variable capacity to a capacity smaller than said necessary air-conditioning capacity before operating said electric motor.

10. A compressor control device as claimed in claim 9, wherein said capacity smaller than said necessary air-conditioning capacity is a minimum capacity of said compressor.

11. A compressor control device as claimed in claim 10, wherein said third means comprises fourth means for stopping said engine when said vehicle stops and said electric motor is operated even if the key switch is turned on.

12. A compressor control device for a vehicle air conditioner which includes a compressor, an electric motor for driving said compressor, a sensor for detecting air-conditioning load, and a clutch mechanism disposed between said compressor and an engine, wherein operation of said compressor control device comprises steps of:

deciding necessary air-conditioning capacity according to said air-conditioning load;

comparing said necessary air-conditioning capacity with said a reference capacity; and controlling said clutch mechanism to connect said compressor with said engine when said necessary cooling capacity is larger than said reference capacity, and to disconnect said compressor from said engine and operate said electric motor to drive said compressor when said necessary cooling capacity is not larger than said reference capacity.

13. A compressor control device for an air conditioner for a vehicle which includes an air conditioner switch, a compressor, an electric motor for driving said compressor, a sensor for detecting air-conditioning load, and a clutch mechanism disposed between said compressor and an engine, wherein operation of said compressor control device comprises steps of:

reading said air conditioning load;

examining switch-on of said air conditioner switch;

examining whether said vehicle stops or not;

deciding necessary air-conditioning capacity according to said air-conditioning load;

comparing said necessary air-conditioning capacity with said a reference capacity; and controlling said clutch mechanism to connect said compressor with said engine when said necessary cooling capacity is larger than said reference capacity, and to disconnect said compressor from said engine and operate said electric motor to drive said compressor when said vehicle stops and said necessary cooling capacity is not larger than said reference capacity.

14. A compressor control device as claimed in claim 13, wherein said compressor has variable output capacity, and said step of controlling comprises a step of changing said variable output capacity according to said necessary cooling capacity when said vehicle stops and said necessary cooling capacity is not larger than said reference capacity.

* * * * *